(12) United States Patent
Bauer

(10) Patent No.: US 6,168,379 B1
(45) Date of Patent: Jan. 2, 2001

(54) HELICOPTER ROTOR BLADE WITH A MOVABLE FLAP

(75) Inventor: Karl Bauer, Waakrichen (DE)

(73) Assignee: Eurocopter Deutschland GmbH, Munich (DE)

(*) Notice: Under 35 U.S.C. 154(b), the term of this patent shall be extended for 0 days.

(21) Appl. No.: 09/259,443

(22) Filed: Mar. 1, 1999

(30) Foreign Application Priority Data

Feb. 27, 1998 (DE) .............................. 198 08 196

(51) Int. Cl.$^7$ ........................................ B64C 3/50
(52) U.S. Cl. ..................... 416/23; 244/215; 244/217; 244/90 R
(58) Field of Search .................. 416/3, 23, 24; 244/75 R, 90 R, 215, 217, 219

(56) References Cited

U.S. PATENT DOCUMENTS

| 2,025,561 | 12/1935 | Wilford . | |
|---|---|---|---|
| 2,369,049 | 2/1945 | Hays . | |
| 2,716,460 | 8/1955 | Young . | |
| 2,776,718 | 1/1957 | Zuck . | |
| 4,247,065 | * 1/1981 | Grob et al. | 244/215 |
| 4,351,502 | * 9/1982 | Statkus | 244/219 |
| 5,224,826 | * 7/1993 | Hall et al. | 416/4 |
| 5,387,083 | 2/1995 | Larson et al. . | |
| 5,588,800 | 12/1996 | Charles et al. . | |
| 5,639,215 | 6/1997 | Yamakawa et al. . | |
| 6,070,834 | * 6/2000 | Janker et al. | 244/219 |
| 6,079,672 | * 6/2000 | Lam et al. | 244/217 |

FOREIGN PATENT DOCUMENTS

| 2804254 | 8/1979 | (DE) . |
| 3039121 | 4/1981 | (DE) . |
| 4243203 | 6/1994 | (DE) . |
| 1392727 | 12/1965 | (FR) . |

* cited by examiner

Primary Examiner—Edward K. Look
Assistant Examiner—Liam McDowell
(74) Attorney, Agent, or Firm—W. F. Fasse; W. G. Fasse

(57) ABSTRACT

A helicopter rotor blade includes a main airfoil body (12) and a movable control flap (3) incorporated in the trailing edge profile of the airfoil body. The flap (3) is movably connected to the main airfoil body (12) by a flexibly bendable junction element (4), and is actuated by a piezoelectric actuator unit (5) via a push/pull rod (6) and a lever arm (7), whereby the control flap is deflected relative to the main airfoil body. The junction element (4) is preferably a continuous integral fiber-reinforced composite component having a flexible bending portion (42) with a reduced thickness in comparison to the adjoining portions, whereby the reinforcing fibers extend continuously through the joint in the direction of the connection between the main airfoil body and the flap.

29 Claims, 3 Drawing Sheets

HELICOPTER ROTOR BLADE WITH A MOVABLE FLAP

PRIORITY CLAIM

This application is based on and claims the priority under 35 U.S.C. §119 of German Patent Application 198 08 196.0, filed on Feb. 27, 1998, the entire disclosure of which is incorporated herein by reference.

FIELD OF THE INVENTION

The invention relates to a helicopter rotor blade particularly having a movable flap along at least a trailing edge of an air-foil profiled portion of the blade.

BACKGROUND INFORMATION

It is generally known to equip helicopter rotor blades with movable flaps or control surfaces, respectively along the trailing edge or the trailing portion of the airfoil profile section. Such flaps or control surfaces serve to control the helicopter. Namely, these flaps can be tilted up or down relative to the main airfoil body of the rotor blade, to achieve an aerodynamic control effect in addition to or separately from the overall pitch control of each blade. In one known arrangement of such flaps on rotor blades, the flaps are pivotally connected by mechanical bearings to the main body of the rotor blade, and are mechanically actuated by a cam plate or swash plate. In this context, the cam plate or swash plate can actuate the flaps of the several rotor blades of a helicopter rotor collectively or also cyclically at a frequency of about 7 Hz, for example.

A more recent conventional rotor blade includes flaps connected to the trailing portion of the airfoil profile by a pivot joint or the like, and these flaps are electrically actuated rather than mechanically actuated by cam or swash plate as described above. Such flaps serve to increase the rotor power and lift generating capacity while simultaneously reducing the extent of vibrations. Due to the electrical actuation of the flaps at a relatively high frequency, e.g. about 35 Hz or higher, the flaps influence the dynamic response and behavior of the rotor blades. Thereby the respective rotor blade is deformed due to the arising aerodynamic forces, in such a manner that the vibration characteristic of the rotor blade is improved.

It is a serious disadvantage of the conventional arrangements, that the bearings suffer very rapid wear due to the alternating movement of the flaps at a relatively high frequency. As a result, the inspection and maintenance intervals are rather short, and the bearings must be replaced frequently. Moreover, the bearings are subjected to high loads due to the various forces arising on the rotor blades due to the effect of the flaps. Such high forces can also result in sudden failures of the bearings, in addition to the rapid wear mentioned above.

SUMMARY OF THE INVENTION

In view of the above, it is an object of the invention to provide a helicopter rotor blade including a movable control flap, with a durable and reliable bearing connection of the flap to the main airfoil body of the blade, so as to reduce the occurrence of wear and to avoid or minimize the damage of the bearing connection arising from the high loads. The invention further aims to avoid or overcome the disadvantages of the prior art, and to achieve additional advantages, as apparent from the present description.

The above objects have been achieved in a helicopter rotor blade according to the invention, including a main airfoil body, a movable control surface or flap, a flexible junction element that movably and flexibly connects the flap to the main airfoil body, and an actuator connected to the flap in order to move the flap to selected positions or deflection angles relative to the main airfoil body. The flexible junction element includes a flexible bending portion at which the junction element flexibly bends when an actuating force is applied to the flap, so as to allow the deflection or movement of the flap relative to the main airfoil body.

The inventive arrangement provides a durable and wear-resistant flexibly movable connection of the flap relative to the main airfoil body of the rotor blade. Moreover, this flexible connection or junction of the flap to the main airfoil body provided by the flexible junction element is also capable of withstanding the high loads that arise, and allows the necessary flap movements at high frequencies without suffering substantial wear. For this reason, the inspection and maintenance intervals can be considerably extended in comparison to the prior art.

The flexible junction element is preferably made of a fiber-reinforced synthetic or plastic composite material, in which the fibers may be glass fibers, for example. The fibers in the composite material achieve an especially high strength with a low weight, i.e. a high strength to weight ratio. The use of glass fibers in this context makes it possible to achieve a particularly high elasticity or insensitivity to strain as well as a high durability and high fatigue strength of the flexible junction element. In order to achieve the flexible bending at a desired location, the junction element preferably includes a flexible bending portion having a reduced thickness as compared to the other portions of the junction element adjoining the flexible bending portion. With this arrangement, the flexible bending will preferentially occur about a virtual axis in the thinner flexible portion.

The fibers of the fiber reinforced composite material of the junction element are preferably oriented to run in the direction of the junction between the main body of the rotor blade and the flap. Moreover, the mutual spacing between the fibers is advantageously reduced in the flexible portion as compared to the rest of the junction element. In other words, the fibers are preferably continuous through the junction element and especially through the flexible bending portion thereof, while comprising a higher fiber density and a reduced proportion of the synthetic matrix material in the flexible bending portion as compared to the remainder of the junction element.

The main airfoil body of the rotor blade is preferably constructed with top and bottom skins or walls over a skeleton of spars and ribbing or over a cellular or foam core or the like or even enclosing a hollow core therein. With such a construction, a flexible junction element preferably connects the top skin of the main airfoil body with the upper part of the flap, and/or a flexible junction element connects the bottom skin of the main airfoil body with a lower part of the flap. In this manner, a particularly good aerodynamic surface contour of the overall rotor blade is achieved.

To further improve the configuration in this regard, the upper part and the lower part of the flap are preferably pressed together in sliding contact with each other in a trailing edge region of the flap. Thereby the upper part and lower part of the flap slidingly move relative to each other along an interposed sliding contact surface when the flap is deflected. The sliding contact surface preferably comprises a layer of polytetrafluoroethylene and/or fluorinated ethylene propylene, for example which is commercially available under the name "Teflon".

With such an arrangement, it is possible to securely and directly connect the upper part of the flap to the top skin of the main airfoil body, and simultaneously securely connect the lower part of the flap to the bottom skin of the main airfoil body, by means of respective flexible junction elements. When the flap is deflected, this arrangement avoids the formation of a gap between the flap and the main airfoil body, so that a smooth, closed aerodynamic transition is formed by the respective flexible junction elements. The occurrence of wearing abrasion along the sliding contact surface is also avoided.

Advantageously in this arrangement, the upper part and the lower part of the flap are pre-stressed to press against each other along the sliding contact surface. Thereby, it is necessary to actuate only one of the parts of the flap to move the entire flap in each respective direction, because the actuated part of the flap will push against and correspondingly move the other part of the flap.

It is preferred that the flexible junction element and the respective parts of the rotor blade and/or of the flap adjoining the junction element are embodied in an integral or one-piece manner, and most advantageously along the entire width of the junction element. The junction element may thus be an integral component essentially consisting of a fiber-reinforced composite material. Especially, the junction element may be arranged in the axis of symmetry of the flap, whereby the possibility of a kinking or over-bending of the junction element can be avoided. Preferably, the flap is moved or actuated by means of at least one lever arm, which connects the upper part and/or the lower part of the flap to the actuator via a push rod or pull rod for transmitting the actuating forces. In this manner, it is possible to move the flap or the respective upper and lower flap parts by means of pulling tension forces or pushing compression forces, which is advantageous for being able to use a piezoelectric actuator. Each flap part can be actuated by a separate lever arm, whereby the total force needed for moving the flap is divided between two actuator linkages, whereby the wear and loads are reduced.

In a particular advantageous embodiment, the actuator linkage comprises a fiber joint between the rod and the lever arm, for transmitting the actuating force to the flap or respective flap part. The rod can be embodied as a simple pull rod or tension rod that is preferably fabricated of one or more fibers and especially glass fibers. This feature makes it possible to actuate the upward and downward deflection of the flap using only tension forces, whereby the occurrence of wear between the lever arm and the rod can be reduced or eliminated. Moreover, this embodiment achieves a high strength, a high durability, and a high fatigue strength of the overall linkage, combined with a small structural size as well as a low weight.

BRIEF DESCRIPTION OF THE DRAWINGS

In order that the invention may be clearly understood it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
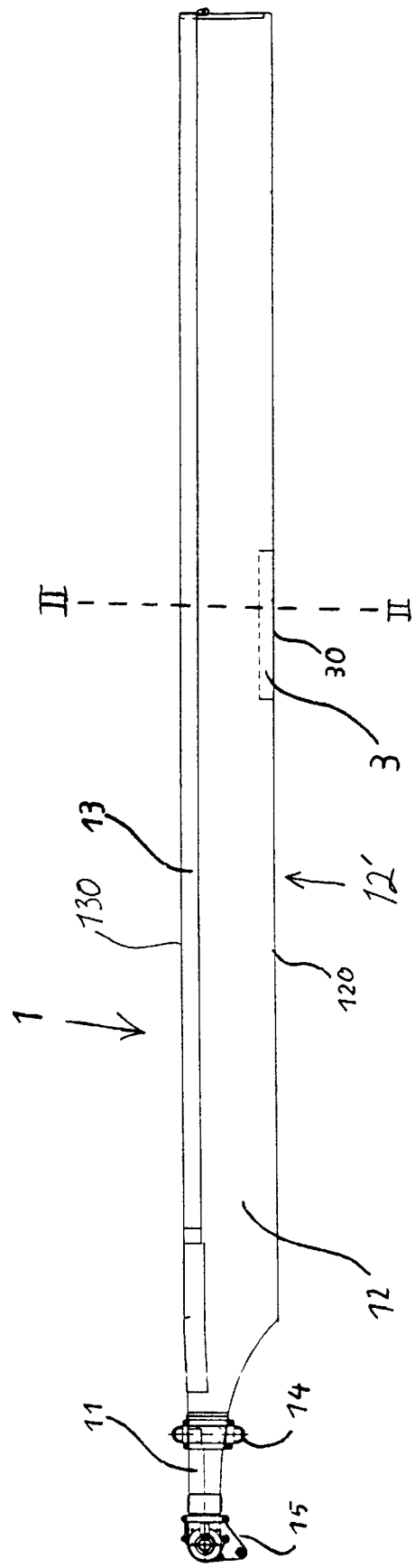
FIG. 1 is a schematic plan view of a helicopter rotor blade including a movable control flap incorporated into the airfoil profile portion of the blade.

FIG. 1 shows a single helicopter rotor blade 1 including a blade connection portion, i.e. a blade root or neck 11, and an airfoil profile portion 12' extending therefrom. The blade neck 11 terminates in a pivot connection member 15, while a pivot joint and/or vibration damper 14 is interposed between the blade neck 11 and the airfoil profile portion 12'. The airfoil profile portion 12' includes a main airfoil body 12 having a leading edge or nose portion 130 and a trailing edge portion 120. A movable control flap 3 is movably connected to the main airfoil body 12 so that it is incorporated into the general profile shape of the main airfoil body 12 along the trailing edge portion 120 thereof.

The main airfoil body 12 has a recess or cut-out along its trailing edge, and the movable control flap 3 is fittingly arranged in this recess so that it forms a part of the overall blade profile shape. A trailing edge portion 30 of the flap 3 extends flushly along the trailing edge of the trailing edge portion 120 of the main airfoil body 12. Thus, in its neutral or initial position, the movable control flap 3 does not protrude out from the smooth outer contour of the overall airfoil profile portion 12'. A protective covering 13 made of metal is arranged to cover the nose or leading edge portion 130 of the main airfoil body 12, and thereby protect the leading edge portion 130 against erosion and impact damage and the like.

Figure 2:
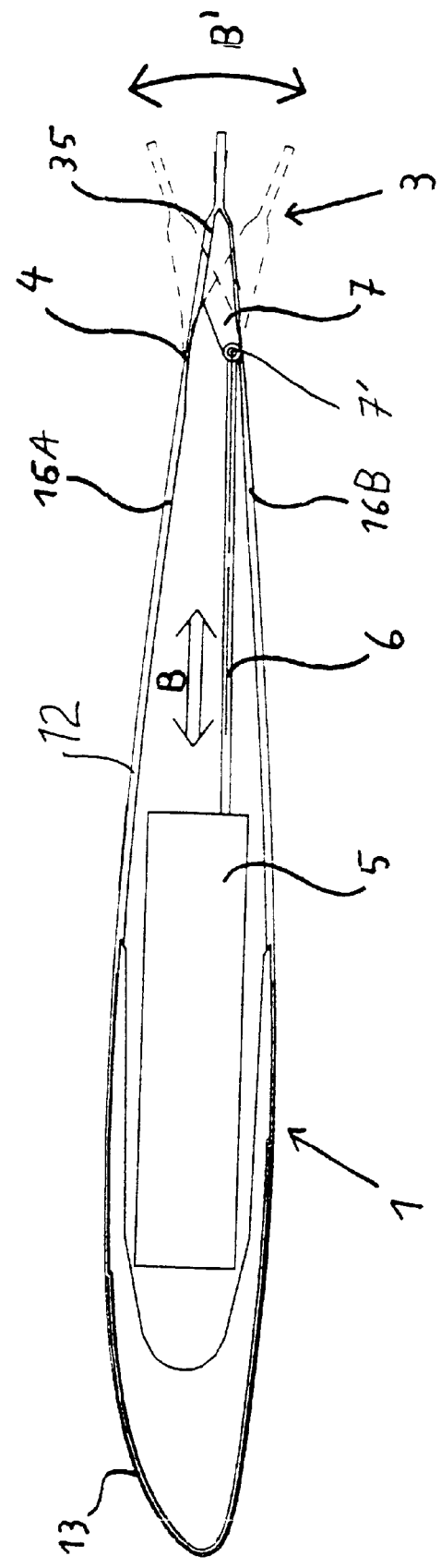
FIG. 2 is a schematic cross-section through the helicopter rotor blade generally according to FIG. 1, as seen along the section line II—II through the area of the flap, according to a first particular embodiment of the invention.

FIG. 2 schematically shows a cross-section along the line II—II of the inventive rotor blade 1 shown in FIG. 1. A flexibly bendable junction element 4 made of a fiber reinforced synthetic composite material flexibly or movably connects the flap 3 to the main airfoil body 12 along the trailing edge portion 120 thereof. The solid lines shown in FIG. 2 depict the neutral or initial position of the control flap 3, while the dashed lines respectively depict an upward deflected position and a downward deflected position of the control flap 3 relative to the main airfoil body 12.

In the present embodiment, the main airfoil body 12 comprises a top skin 16A and a bottom skin 16B, whereby the top skin 16A is connected to an upper portion 35 of the flap 3 by means of the flexibly bendable junction element 4 forming a flexible fiber joint therebetween. In the area of this junction, the junction element 4 together with the adjoining portions of the upper part 35 of the flap 3 and the top skin 16A of the main airfoil body 12 are formed in an integral or one-piece manner, over the entire width of the flap 3 perpendicular to the section line II—II in FIG. 1.

An actuator unit 5 is arranged and mounted in an interior space between the top skin or wall 16A and the bottom skin or wall 16B of the main airfoil body 12. The actuator unit 5 is preferably a piezoelectric actuator comprising piezoelectric elements generating an output stroke movement. A push/pull rod 6 connects the actuator unit 5 to a lever arm 7, which in turn is connected to the control flap 3. The push/pull rod 6 may be connected by a pivot journal bearing 7' or a flexible joint, which may even be an integral flexible joint, to the lever arm 7. When the actuator unit 5 moves the push/pull rod 6 in its lengthwise direction B, the lever arm 7 is moved so as to actuate or deflect the flap 3 relative to the main airfoil body 12 in the deflecting direction B' as shown in FIG. 2. In this embodiment, the actuation of the control flap 3 can be achieved electrically, i.e. by controlledly electrically actuating the piezoelectric elements of the actuator unit 5, for example at a frequency of 35 Hz or even more.

Figure 3:
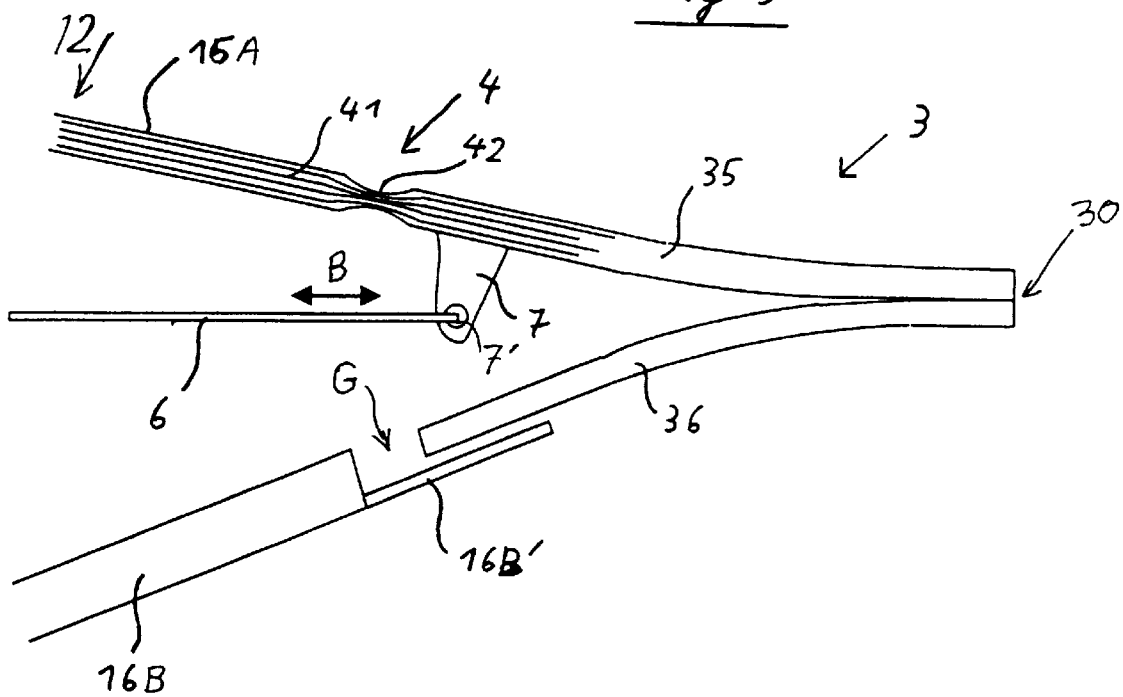
FIG. 3 is an enlarged schematic cross-sectional detail view through the rear or trailing edge portion of a flap provided on a rotor blade according to a second embodiment of the invention.

FIG. 3 schematically shows an enlarged, detailed cross-section through the trailing edge region of an example embodiment of a rotor blade 1 according to the invention. The junction element 4 connecting the top skin 16A of the main airfoil body 12 and the upper part 35 of the control flap 3 is made of a fiber-reinforced composite material comprising glass fibers 41 that are oriented to extend in the direction of the connection between the main airfoil body 12 and the flap 3. Preferably, the fibers are continuous through the junction element 4. For the sake of clarity, the fibers 41 have only been schematically illustrated in the area of the junction element 4 and the immediately adjoining areas of the top skin 16A and the upper part 35, but have otherwise been omitted.

The junction element 4 is embodied as an integral or unitary flexible fiber joint, with a flexible bending portion 42 having a relatively reduced thickness compared to the adjoining portions of the junction element 4. Due to this reduced thickness, an effective bending axis is formed within this bending portion 42, so that the deflecting movement of the flap 3 is carried out about this axis lying in the flexible bending portion 42. The flexible fiber joint formed by the junction element 4 preferably has a remaining wall thickness in the range of approximately 0.5 mm to 1 mm in the thinner flexible bending portion 42. It has been found that a wall thickness in this range achieves a sufficient strength in combination with good bending properties, so as to achieve a high strength and high durability and fatigue strength thereby.

The mutual spacing between respective adjacent ones of the fibers 41 is reduced in the flexible bending region or portion 42. Thus, while the fibers extend continuously through this bending portion 42, the amount and proportion of the synthetic resin or other matrix material in this bending portion 42 is reduced relative to the adjoining areas. The continuous extension of the fibers through the flexible joint achieves a particularly high strength and durability.

The bottom skin or wall 16B of the main airfoil body 12 is provided with a skirt extension 16B' that protrudes outwardly or rearwardly from the trailing end of the bottom skin 16B and covers a gap G between the end of the bottom skin 16B of the main airfoil body 12 and the lower part 36 of the flap 3. Thereby, the skirt extension 16B' acts as an aerodynamic fairing, and avoids negative airflow influences that would otherwise be caused by the gap G on the side of the rotor blade 1 opposite the junction element 4. In this embodiment, the upper part 35 and the lower part 36 of the flap 3 are substantially rigidly connected to each other along the trailing edge portion 30. Thus, there is no relative motion between the respective facing edges of the lower part 36 of the flap 3 and the bottom skin 16B of the main airfoil body 12, i.e. the gap G is a working gap having a variable size depending on the deflection position of the flap 3.

As an alternative to the arrangement shown in FIG. 3, the junction element 4 may be arranged on the bottom side of the rotor blade 1, i.e. so as to interconnect the bottom skin 16B with the lower part 36. In such an arrangement, the skirt extension 16B' would be arranged to cover a gap on the upper surface of the rotor blade 1, namely between the top skin 16A and the upper part 35. In either of these alternative embodiments, the control flap 3 is connected to the main airfoil body 12 via the junction element 4 along its entire width. This continuous width-wise connection without a gap achieves improved strength and durability, and especially achieves a substantially improved aerodynamic characteristic in the area of the junction element 4 due to the smooth transition that is provided thereby. The smooth transition between the main airfoil body 12 and the control flap 3 on the other surface, i.e. the transition provided by the skirt extension 16B', similarly achieves a particularly improved aerodynamic effect.

Figure 4:
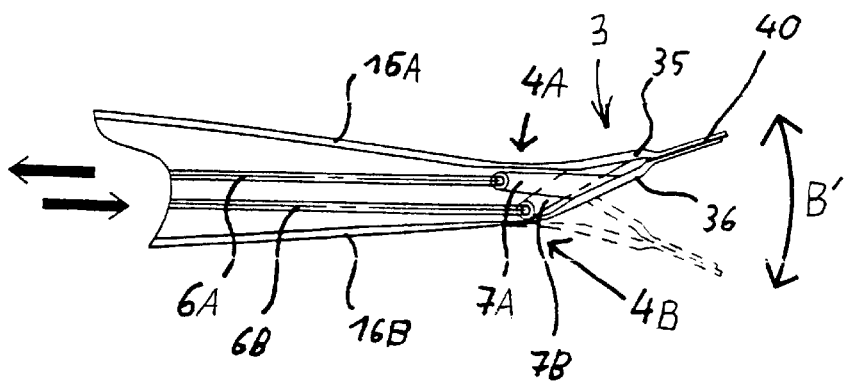
FIG. 4 is a partial broken cross-section through the control flap area of a helicopter rotor blade according to a further embodiment of the invention.

FIG. 4 shows another embodiment of the invention, wherein two junction elements 4A and 4B respectively join both the top skin 16A to the upper part 35 of the flap 3 as well as the bottom skin 16B to the lower part 36 of the flap 3, respectively. The two flap parts 35 and 36 are connected and actuated via separate lever arms 7A and 7B through respective separate push/pull rods 6A and 6B that are in turn connected and actuated by two actuator units (not shown). Along the trailing edge portion of the flap 3, the upper part 35 and the lower part 36 of the flap 3 are pressed against each other along a sliding contact surface 40. Preferably, the sliding contact surface 40 comprises a coating or layer of "Teflon" along the contact area between the two flap parts 35 and 36 in order to prevent or reduce wear and abrasion along this area.

The two push/pull rods 6A and 6B are counter-actuated so that they respectively move in opposite directions. For example, a pulling or tension force may be applied via the upper rod 6A to the upper lever arm 7A, and in turn to the lower part 36 of the flap 3, to deflect the lower part 36 upwardly. Simultaneously, a pushing force is applied via the lower rod 6B and the lever arm 7B onto the upper part 35 of the flap 3 so as to deflect the upper part 35 upwardly. Due to this arrangement, substantially only half the actuating force is necessary for actuating each separate part 35 or 36 of the flap 3, and also the contact forces along the sliding contact surface 40 are reduced, even though the trailing edge portions of the flap parts 35 and 36 preferably remain in sliding contact with each other along the surface 40 throughout the entire range of deflection angles of the flap 3. For these reasons, the loads applied to the components and the amount of wear at the junctions between the push/pull rods 6A and 6B and the lever arms 7A and 7B, and along the sliding contact surface 40, can be minimized.

The use of two junction elements 4A and 4B at the top skin 16A and the bottom skin 16B of the airfoil body 12 achieves a particularly high strength, durability, and fatigue resistance of the overall flexible connection of the flap 3 to the main airfoil body 12. Moreover, this arrangement achieves aerodynamically beneficial smooth surface transitions without any gaps, and without requiring a skirt extension as described in the above embodiment of FIG. 3. Also, there is no gap along the trailing edge, because of the sliding contact along surface 40.

According to a further feature, the upper part 35 and the lower part 36 of the flap 3 may be pre-stressed so that they press positively against each other along the sliding contact surface 40 over the entire range of deflection angles. With this feature, it is possible to move or actuate the entire flap 3, i.e. both flap parts 35 and 36, using a single one of the lever arms 7A or 7B. For example, when a pulling or tension force is applied via the upper rod 6A to the upper lever element 7A, and in turn to the lower part 36 of the flap 3, the entire flap 3 is deflected upwardly. This is achieved because the lower part 36 of the flap 3 is pulled upwardly by the lever arm 7A, and the lower part 36 in turn pushes the upper part 35 upwardly due to the contact along the sliding contact surface 40. On the other hand, if a pushing force is applied to the upper rod 6A, the lower flap part 36 is pushed downwardly, and the upper flap part 35 follows downwardly due to its downward pre-stressing. Even with this variant, it is possible to utilize two lever arms 7A and 7B driven by two push/pull rods 6A and 6B, for example to achieve a safety redundancy so that the flap 3 will be actuatable by the other push/pull rod in the event one of the push/pull rods ruptures or otherwise fails. It should also be understood that a single actuator unit can be used to actuate two push/pull rods 6A and 6B in mutual opposite directions, or two separate actuator units can be used to similarly achieve a safety redundancy.

Further according to the invention, the push rod 6 and the lever arm 7 in any one of the above embodiments may be integrated to form a one-piece actuator linkage component. This integral component preferably comprises one or more glass fibers, whereby the lever arm 7 and the push/pull rod 6 are joined to each other by a flexibly bendable integral fiber joint 7'. In this embodiment, the push/pull rod 6 is especially used only as a tension element or pull rod 6, since the glass fiber construction is especially suitable for transmitting tension forces rather than pushing or compression forces.

In the embodiment of FIG. 4, using two pull rods 6A and 6B respectively connected to the lower and upper parts 36 and 35 of the flap 3 via lever arms 7A and 7B, it is possible to actuate the flap 3 in both deflection directions using only tension or pulling forces applied through the pull rods 6A and 6B. Namely, pulling the rod 6A deflects the entire flap 3 upward, while pulling the rod 6B deflects the entire flap downward. Such an actuating arrangement is especially advantageous for use in connection with a piezoelement actuator unit 5, and makes it possible to achieve a particularly lightweight and compact structural arrangement.

The present inventive rotor blade arrangement includes movable control flaps having a substantially wear-free flexible bearing connection, that can withstand high loads and requires a substantially reduced maintenance effort. Even when operated at high frequencies of the flap actuation, the flexible junction remains durable and strong, and makes it possible to achieve a deflection angle of the flap over the range of approximately ±15° or even more. Additionally, the present junction arrangement provides improved aerodynamics. Interfering vibrations of the rotor blade can be actively damped or counteracted, especially in connection with an actuation of the flaps at a high frequency by means of an actuator comprising piezoelectric elements. Also, the junction element is very reliable, and provides a high degree of safety against failures, with a particularly lightweight, compact, and simple structural arrangement.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:
1. A rotor blade for a helicopter, comprising
a main airfoil body,
a flap that is deflectable relative to said main airfoil body,
at least one flexibly bendable junction element connecting said flap to said main airfoil body, and
an actuator mechanism connected to said flap and adapted to deflect said flap through a deflection angle relative to said main airfoil body, wherein said at least one junction element respectively comprises a flexible bending portion at which said junction element is adapted to flexibly bend when said flap is deflected by said actuator mechanism, and remaining portions adjoining said flexible bending portion, and wherein said flexible bending portion has a relatively thinner wall thickness than said remaining portions.

2. The rotor blade according to claim 1, wherein said main airfoil body has an airfoil profile section with a recess notch in a main trailing edge of said main airfoil body, said flap has a shape corresponding to said recess notch, said flap fits flushly into said notch and matches a contour of said airfoil profile section when said flap is in a non-deflected neutral position, and said flap has a flap trailing edge that aligns with said main trailing edge when said flap is in said non-deflected neutral position.

3. The rotor blade according to claim 1, wherein said flexibly bendable junction element is made of a fiber-reinforced composite material comprising fibers in a synthetic matrix material.

4. The rotor blade according to claim 3, wherein said fibers are glass fibers.

5. The rotor blade according to claim 3, wherein said flexibly bendable junction element essentially consists of a single integral member of said fiber-reinforced composite material.

6. The rotor blade according to claim 3, wherein said fibers are oriented to run in a direction extending in said junction element between said main airfoil body and said flap, and wherein said fibers are arranged to have a relatively smaller spacing between said fibers in said flexible bending portion and a relatively greater spacing between said fibers in said remaining portions of said junction element adjoining said flexible bending portion.

7. The rotor blade according to claim 6, wherein said fibers are continuous fibers extending continuously through said remaining portions and said flexible bending portion of said junction element between said main airfoil body and said flap.

8. The rotor blade according to claim 3, wherein said composite material has a higher density of said fibers and a lower proportion of said matrix material in said flexible bending portion than in said remaining portions.

9. The rotor blade according to claim 8, wherein said relatively thinner wall thickness of said flexible bending portion is in a range from 0.5 mm to 1 mm.

10. The rotor blade according to claim 1, wherein said relatively thinner wall thickness of said flexible bending portion is in a range from 0.5 mm to 1 mm.

11. The rotor blade according to claim 1, wherein said main airfoil body comprises a top skin wall and a bottom skin wall, wherein said flap comprises an upper flap part and a lower flap part that are fixedly connected to each other along respective trailing edge portions thereof, and wherein said junction element is arranged such that said junction element connects said upper flap part with said top skin wall while a gap remains between said lower flap part and said bottom skin wall which are not connected to each other.

12. The rotor blade according to claim 11, further comprising a skirt extension that is connected to one of said main airfoil body and said flap and extends therefrom so as to cover said gap.

13. The rotor blade according to claim 1, wherein said junction element is an integral unitary component that is integrally joined with said main airfoil body and with said flap along an entire width of said junction element.

14. The rotor blade according to claim 1, wherein said junction element is arranged to lie on an axis of symmetry of said flap.

15. The rotor blade according to claim 1, wherein said flap comprises an upper flap part and a lower flap part, wherein said actuator mechanism comprises at least one actuator rod and at least one lever arm respectively connected to said at least one actuator rod, and wherein said at least one lever arm is further respectively connected to at least one of said upper flap part and said lower flap part.

16. The rotor blade according to claim 15, including only a single one of said actuator rod and a single one of said lever arm, and wherein said actuator rod is constructed as a push-and-pull rod adapted to transmit pushing forces and pulling forces to said lever arm.

17. The rotor blade according to claim 15, wherein said at least one actuator rod includes a first actuator rod and a second actuator rod, said at least one lever arm includes a first lever arm and a second lever arm that are respectively individually connected to said first and second actuator rods and to said upper and lower flap parts.

18. The rotor blade according to claim 17, wherein each one of said actuator rods is constructed and adapted to be able to respectively transmit pushing forces and pulling forces to said lever arms.

19. The rotor blade according to claim 17, wherein each one of said actuator rods is constructed and adapted to be able to respectively transmit only pulling forces and no pushing forces to said lever arms.

20. The rotor blade according to claim 19, wherein each one of said actuator rods respectively comprises at least one tension fiber.

21. The rotor blade according to claim 20, wherein said tension fiber is a glass fiber.

22. The rotor blade according to claim 15, wherein said at least one actuator rod is respectively an integral component together with said at least one lever arm, and wherein a flexible fiber bending joint is integrally formed at a junction of said at least one actuator rod and said at least one lever arm respectively.

23. The rotor blade according to claim 1, wherein said actuator mechanism comprises an actuator unit including piezoelectric elements.

24. The rotor blade according to claim 1, wherein said main airfoil body comprises a top skin wall and a bottom skin wall, wherein said flap comprises an upper flap part and a lower flap part that are fixedly connected to each other along respective trailing edge portions thereof, and wherein said junction element is arranged such that said junction element connects said lower flap part with said bottom skin wall while a gap remains between said upper flap part and said top skin wall which are not connected to each other.

25. The rotor blade according to claim 24, further comprising a skirt extension that is connected to one of said main airfoil body and said flap and extends therefrom so as to cover said gap.

26. A rotor blade for a helicopter, comprising a main airfoil body, a flap that is deflectable relative to said main airfoil body, at least one flexibly bendable junction element connecting said flap to said main airfoil body, and an actuator mechanism connected to said flap and adapted to deflect said flap through a deflection angle relative to said main airfoil body, wherein said at least one junction element respectively comprises a flexible bending portion at which said junction element is adapted to flexibly bend when said flap is deflected by said actuator mechanism, wherein said flap comprises an upper flap part and a lower flap part that are not rigidly connected to each other and that are in slidable contact with each other along a sliding contact surface between respective trailing edge portions of said upper flap part and said lower flap part, wherein said upper flap part and said lower flap part are adapted to move relative to each other along said sliding contact surface when said flap is deflected relative to said main airfoil body, and wherein said sliding contact surface comprises a layer of at least one of polytetrafluoroethylene and fluorinated ethylene propylene.

27. The rotor blade according to claim 26, wherein said main airfoil body comprises a top skin wall and a bottom skin wall, wherein said junction element connects said top skin wall with said upper flap part, and further comprising another flexibly bendable junction element including another flexible bending portion at which said another junction element is adapted to flexibly bend when said flap is deflected, and wherein said another junction element connects said bottom skin wall with said lower flap part.

28. A rotor blade for a helicopter, comprising a main airfoil body, a flap that is deflectable relative to said main airfoil body, at least one flexibly bendable junction element connecting said flap to said main airfoil body, and an actuator mechanism connected to said flap and adapted to deflect said flap through a deflection angle relative to said main airfoil body, wherein said at least one junction element respectively comprises a flexible bending portion at which said function element is adapted to flexibly bend when said flap is deflected by said actuator mechanism, wherein said flap comprises an upper flap part and a lower flap part that are not rigidly connected to each other and that are in slidable contact with each other along a sliding contact surface between respective trailing edge portions of said upper flap part and said lower flap part, wherein said upper flap part and said lower flap part are adapted to move relative to each other along said sliding contact surface when said flap is deflected relative to said main airfoil body, and wherein said upper flap part and said lower flap part are pre-stressed so as to press against each other along said sliding contact surface over a full range of deflection of said flap relative to said main airfoil body.

29. The rotor blade according to claim 28, wherein said main airfoil body comprises a top skin wall and a bottom skin wall, wherein said junction element connects said top skin wall with said upper flap part, and further comprising another flexibly bendable junction element including another flexible bending portion at which said another junction element is adapted to flexibly bend when said flap is deflected, and wherein said another junction element connects said bottom skin wall with said lower flap part.

* * * * *

UNITED STATES PATENT AND TRADEMARK OFFICE
CERTIFICATE OF CORRECTION

PATENT NO. : 6,168,379 B1
DATED : January 2, 2001
INVENTOR(S) : Bauer

It is certified that error appears in the above-identified patent and that said Letters Patent is hereby corrected as shown below:

Column 10,
Line 39, before "element", replace "function" by -- junction --.

Signed and Sealed this

First Day of April, 2003

JAMES E. ROGAN
*Director of the United States Patent and Trademark Office*